UNITED STATES PATENT OFFICE.

JACOB S. ROBESON, OF CAMDEN, NEW JERSEY, ASSIGNOR TO ROBESON PROCESS COMPANY, OF CAMDEN, NEW JERSEY, A CORPORATION OF NEW JERSEY.

MOLDED ARTICLE OF GRANULAR MATERIAL.

947,128.  Specification of Letters Patent.  Patented Jan. 18, 1910.

No Drawing.  Application filed August 1, 1904. Serial No. 219,101.

*To all whom it may concern:*

Be it known that I, JACOB S. ROBESON, a citizen of the United States, and a resident of Camden, New Jersey, have invented certain Improvements in Molded Articles of Granular Material, of which the following is a specification.

My invention relates to the manufacture of cores, molds, briquets and other articles of a similar character composed of granular or pulverized material and a binding agent.

My invention consists of an improved article of this character, employing a special binder of such a nature as to insure to a greater extent than heretofore the adherence and coherence of such material, and one that will serve the further purpose of rendering such briquets, cores, molds and other articles capable of resisting, to a very high degree, all danger of accidental breakage during their manufacture and subsequent use.

In the manufacture of cores and molds from sand for use in the casting of metal, and in the manufacture of other briquet forms made of granular or pulverized material of any character, it is necessary to employ some material of an adhesive nature as a binding agent, such material, when the core, mold or other briquet form is finished, readily drying and having the property of resisting moisture and maintaining the finished article in proper shape under all normal conditions until used. For this binder, I have discovered that an "acid resinate" possesses all of the desirable qualifications, and I employ this material which I obtain in the following manner:

In the manufacture of cellulose pulp under what is known as the "sulfite process", a great quantity of a watery substance, familiarly known as "waste sulfite liquor" is formed, which has hitherto been of no commercial value, and its ready disposal without expense to the paper manufacturer has been and is a serious problem. It contains in solution, however, all of the resins, gums and acids of the wood operated upon, and although its proportions of solids is relatively small as compared with its entire bulk, this material can be rendered available and commercially valuable by evaporation or concentration when such evaporation is conducted under conditions precluding decomposition. The original liquor readily decomposes when evaporated in an acid condition like that in which it comes from the digesters, or if it be evaporated at high temperatures or in contact with air; and decomposition, once inaugurated, appears to become progressive, the material soon being converted into decomposition products of no value. In my Patent No. 833,634, dated October 16, 1906, I have set forth a suitable method of concentrating this waste liquor to obtain an undecomposed, viscous concentrate, and the material obtained by such treatment I employ as the binder for the granular or pulverized material. Inasmuch as this concentrated mass has an acid base and contains all of the resins and gums of the wood operated upon to obtain the cellulose pulp I have termed it an "acid resinate".

The described compound or "acid resinate" is used in connection with cores in molding and foundry work by mixing the same thoroughly with the sand intended for core making, and in the production of large cores it has been found advantageous to apply a coating of the "acid resinate" directly to the same in any convenient manner in addition to mixing the same with the sand thereof, which action tends not only to strengthen the cores, but also to facilitate the removal of the same after the casting operation has been completed. This is due to the fact that the dried body of the "acid resinate" will readily char under the influence of the heat of the metal, and leave the cores in a loose condition, permitting their ready removal and compensating for any yielding or shrinkage of the metal while cooling, without straining the same. It has been found in practice, moreover, that cores made or treated with an "acid resinate" have a smoother and harder surface when dried, insuring the making of better castings; and that much less dense smoke and offensive odors are given off in the pouring of the molten metal, than with the use of other core binders having the same general characteristics.

In the operation of casting metal the offensive odors and dense clouds of smoke given off during the pouring operation have been looked upon for a long time as features to be avoided, but molders have been without the means or material at their command to effect such a result. In the use in such operations of cores or molds made with my improved "acid resinate" binder, the pungent odors and dense and likewise offensive smoke given off are reduced to a minimum.

In addition to its value as a binder for sand in the manufacture of cores and molds the "acid resinate" made in accordance with my invention is equally available for binding briquets of iron ore concentrates, or coal dust or other carbonaceous material for fuel, as well as carborundum in the manufacture of bricks for furnace linings, and in fact as a binding agent for any granular or pulverized material that may be afterward sintered or fritted if so desired, and the term "mineral matter" in the claims is to be understood as covering the materials herein mentioned.

In practice an important function of the binder compound in molding operations is to keep the sand of the molds porous or loose and thus facilitate the escape of air and gases, as well as to lessen the liability of blowing and all difficulty of removing the core, and I find that the "acid resinate" binder made in acordance with my invention combines all of these desirable qualifications.

Having thus described my invention, I claim and desire to secure by Letters Patent:

1. As a new article of manufacture, a molded article comprising finely divided mineral matter, and a binder consisting of a concentrated mass of waste sulfite liquor of viscous nature.

2. As a new article of manufacture, a molded article composed of sand, and a binder consisting of a concentrated mass of waste sulfite liquor.

3. As a new article of manufacture, a molded article comprising finely divided mineral matter, and a binder consisting of a concentrated and undecomposed mass of waste sulfite liquor.

4. As a new article of manufacture, a molded article composed of sand, and a binder consisting of a concentrated and undecomposed mass of waste sulfite liquor.

5. As a new article of manufacture, a molded article composed of sand and a binder comprising a concentrated and undecomposed mass of waste sulfite liquor, said article having an external coating of said binder.

In testimony whereof, I have signed my name to this specification, in the presence of two subscribing witnesses.

JACOB S. ROBESON.

Witnesses:
MURRAY C. BOYER,
JOS. H. KLEIN.